March 2, 1965  G. D. WALLEY ETAL  3,171,620
AIRCRAFT FUSELAGES

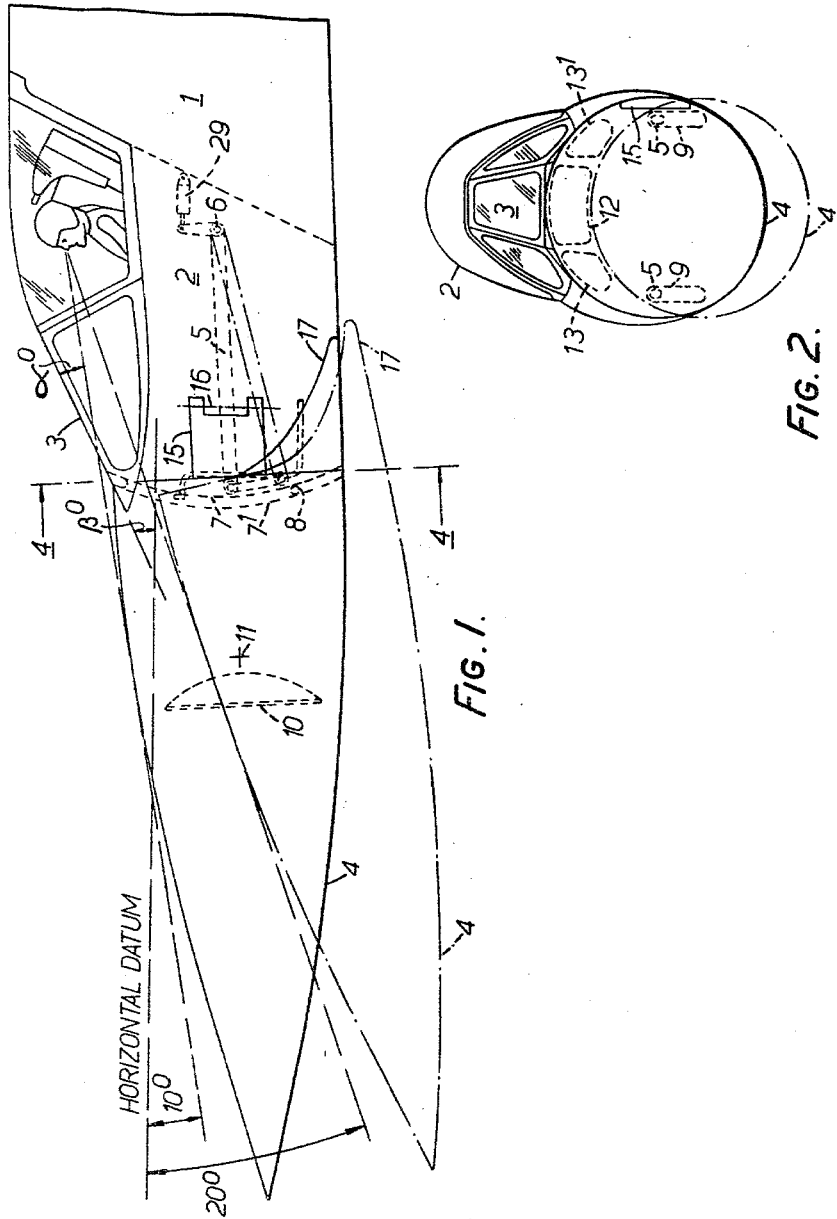

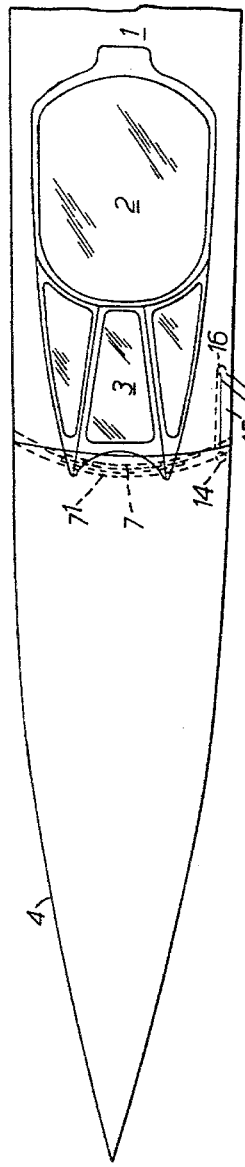
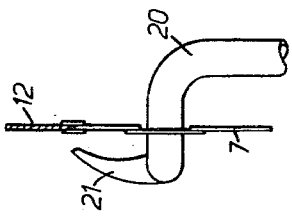
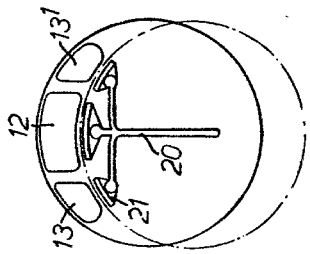

Filed July 22, 1963  3 Sheets-Sheet 3

3,171,620
AIRCRAFT FUSELAGES
Gerald David Walley, Freckleton, near Preston, and
 Dennis Stokes Warburton, Lytham St. Annes, England,
 assignors to English Electric Aviation Limited, Westminster, London, England, a British company
Filed July 22, 1963, Ser. No. 296,827
Claims priority, application Great Britain, July 24, 1962,
28,509/62
11 Claims. (Cl. 244—120)

The present invention relates to the nose portion of aircraft fuselages. In aircraft requiring a large diameter radar dish, which has a large swept diameter, downward vision of the pilot for landing is restricted by the radome, arranged in the nose portion of the fuselage and blending aerodynamically into the fuselage and cockpit profiles. In view of the high angle of incidence when landing, say 15°, the downward vision of the pilot has to be improved. It has been proposed to achieve this by hinging the entire cockpit to the main portion of the fuselage about a horizontal axis so as to be able to droop the cockpit preparatory to landing. This arrangement requires however pressure sealed articulations of all the controls leading from the cockpit to the main fuselage with consequent complication of construction and maintenance and increase in weight.

The invention has the primary object of providing an aircraft fuselage affording improved vision to the pilot for landing at high angles of incidence while obviating pressure sealed articulations between the cockpit and the main fuselage.

The invention has the further object of providing a fuselage of the kind referred to wherein the nose portion can moreover be swung back on the ground so as to shorten the length of the fuselage, particularly for use on board of an aircraft carrier.

With these and other objects in view which will become apparent later from this specification and the accompanying drawing, we provide an aircraft fuselage, comprising in combination: a main fuselage portion, a pilot's cockpit fixedly attached to said main fuselage portion, and a nose portion hinged to said cockpit about a transverse horizontal axis so as to be capable of being lowered preparatory to landing and to increase the pilot's downward vision, and also about a vertical hinge axis capable of hinging said nose portion so that it can be swung back on the ground so as to shorten the length of the aircraft.

These and other features of our said invention will be readily understood from the following description of a preferred embodiment thereof given by way of example with reference to the accompanying drawings, in which:

FIG. 1 is a side elevation, and

FIG. 2 is an end elevation of the cockpit and nose portion of an aircraft fuselage, showing the nose portion in the ordinary flight position in full lines, and in the drooped position in chain-dotted lines.

FIG. 3 is a plan view to FIG. 1 and shows the nose portion in the ordinary position in full lines, and in the folded-back position in chain-dotted lines.

FIG. 4 is a section of FIG. 1 on the line 4—4.

FIG. 5 is a detail of FIG. 1 on a larger scale.

Figure 6:
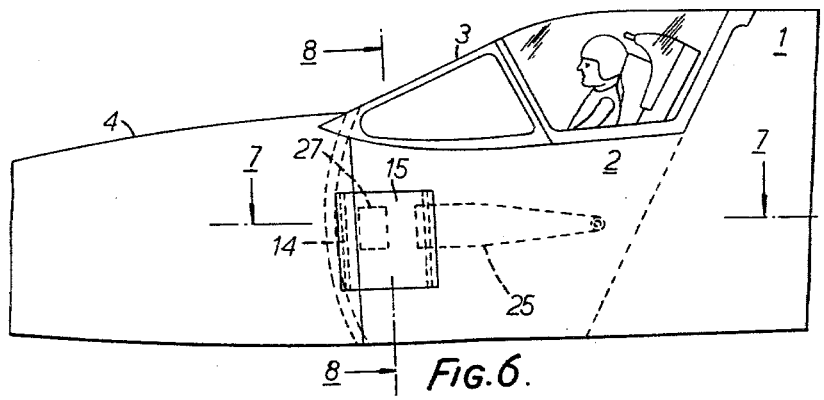
FIG. 6 is a side elevation of a modified embodiment.

The fuselage proper 1 has the pilot's cockpit 2 fixedly attached to it. This cockpit has a forward plane glass pane 3 including an angle $\beta$ of 28°–30° with the horizontal datum line of the aircraft, and a convexly curved forward bulkhead 7 containing three additional windows 12, 13, 13' (FIGS. 2 and 4, 5) near its upper edge. A radome 4 containing a radar dish 10 revolving about a center 11 is attached to two radius rods 5 hinged about co-axial horizontal pivots 6 on the sides of the cockpit, each in its own channel 9. The radome 4 can be drooped by the pilot in flight about a horizontal transverse axis coaxial with said curved bulkhead 7 into the position shown in FIGS. 1 and 2 in chain-dotted lines, by means of conventional hydraulic jacks 29 (FIG. 1).

The lowest line of vision of the pilot should enclose an angle $\alpha$ with the forward pane 3 of the wind screen, amounting to a minimum of 15° and preferably to 18°. This line of vision, which is tangent to the top surface of the radome 4 in the normal position thereof includes an angle of 10° with the horizontal datum of aircraft, which is adequate for normal flight, but insufficient for landing.

When the radome 4 is dropped as shown in chain-dotted lines in FIG. 1, this angle is increased to 20° as required for landing at a high angle of incidence of say 15°. In this position the three additional window panels 12, 13, 13' in the forward bulkhead 7 of the cockpit are exposed (FIG. 3) affording the vision required for landing.

Tracks and anti-friction rollers 8 may be arranged between the forward bulkhead 7 of the cockpit and co-axially curved rear bulkhead 7' of the radome 4.

After landing, the radome 4 is raised to the normal position shown in full lines. The connection between the radome 4 and the radius arm 5 may be detached by the ground crew. A hinge panel 15 hinged to, say, the port side of the cockpit 2 about a vertical pivot 16 is then connected to the radome 4 by a vertical pivot 14. This panel 15 is normally flush with the outer surface of the cockpit 2, but can be swung out, after unlocking the pivot 14. The radome 4 may then be swung back by hand almost 180° into the folded position shown in FIG. 3, so as to shorten the length of the fuselage considerably, as required by the dimensions of lifts and hangars of aircraft carriers.

It will be noted from FIG. 1, that in the drooped position of the radome 4 a fairing 17 at the lower rear edge thereof moves under the underside of the cockpit, so as to provide a smooth airflow over the underside of the fuselage.

The arrangement according to the invention requires breakable or looped cable or hose connections only between the radar equipment in the radome 4 and the cockpit 2 or fuselage 1, but no special pressure-sealed articulated connections between the cockpit controls and the fuselage. As the radius arms 5 each move in their own channel in the cockpit 2 no pressure-sealed articulation is required for them either.

Rain, ice, etc. can be removed from the gap between the two co-axial cockpits 7, 7', and particularly from the additional windows 12, 13, 13' by blowing hot air from the compressor of the propulsion plant (not shown) of the aircraft through a branched pipe 20 and the narrow slots of nozzles 21 beneath these windows (FIGS. 4 and 5).

Figure 7:
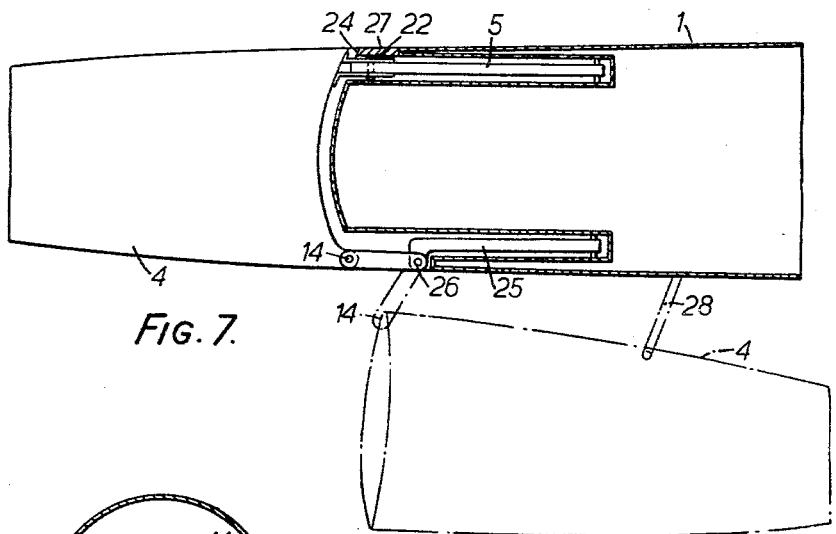
FIG. 7 is a plan view in section on the line 7—7 of FIG. 6.
Figure 8:
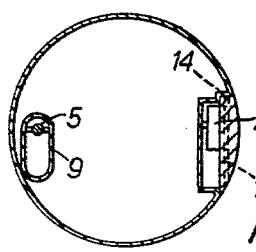
FIG. 8 is a section on the line 8—8 of FIG. 6.

For flying, the hinged panel 15 is disconnected from the radome 4 and locked in the side of the cockpit 2. An access panel 27 (FIG. 6) to the pin 14 is provided for this purpose. Links 28 (FIG. 7) detachably hinged to the nose 4 and to the fuselage may be provided for stabilizing the radome 4 when folded back. If desired, the hinge panel 15 may be hinged into the port side to a radius arm 25, which for this purpose would have to be shortened and deepened while a detachable or extensible connection 24 (containing a removable pin 22 accessible through another access panel 27) may be provided between the starboard radius arm 5 and the radome 4 to allow its folding back (FIGS. 6-8).

While we have herein described and illustrated in the accompanying drawing what may be considered typical and particularly useful embodiments of our said invention, we wish it to be understood that we do not limit ourselves to the particular details and dimensions described and illustrated for obvious modifications will occur to a person skilled in the art.

What we claim as our invention and desire to secure by Letters Patent is:

1. An aircraft fuselage, comprising in combination: a main fuselage portion, a pilot's cockpit fixedly attached to said main fuselage portion and a nose portion hinged to said cockpit both about a transverse horizontal axis and about a lateral vertical axis so as to be capable of being lowered in flight preparatory to landing to increase the pilot's downward vision, and to be swung back on the ground so as to shorten the overall length of said nose portion.

2. An aircraft fuselage as claimed in claim 1, wherein the lower part of the rear edge of said nose portion in the lower position of the latter fits under the underside of said cockpit.

3. An aircraft fuselage as claimed in claim 1, comprising a convex forward bulkhead of said cockpit curved co-axially with said transverse horizontal axis.

4. An aircraft fuselage as claimed in claim 1 comprising a convex forward bulkhead of said cockpit curved co-axially with said transverse horizontal axis and auxiliary windows arranged adjacent the upper edge of said bulkhead and cleared to the pilot's vision in the lowered position of said nose portion.

5. An aircraft fuselage as claimed in claim 1, comprising a convex forward bulkhead of said cockpit, a concave rear bulkhead of said nose portion, both said bulkheads being curved co-axially with said transverse horizontal axis, slots in said convex bulkhead, and blower means installed on said cockpit capable of blowing in operation hot air into the gap between said convex and said concave bulkhead.

6. An aircraft fuselage as claimed in claim 1, comprising two radius arms connected to said nose portion at both sides thereof, and two trunnions mounted on said cockpit co-axially with said transverse horizontal axis, said radius arms being hinged on said trunnions.

7. An aircraft fuselage as claimed in claim 1 comprising two longitudinal channels arranged in said cockpit sealed therefrom and open forward towards said nose portion, a radius arm arranged in each of said channels and connected to said nose portion, and two trunnions mounted in said channels co-axially with said transverse horizontal axis, said radius arms being hinged on said trunnions.

8. An aircraft fuselage as claimed in claim 1, comprising a hinge panel arranged at one side of said cockpit flush with the outer surface thereof and hinged about said vertical axis, and another vertical axis hinging the free end of said hinge panel to said nose portion, allowing the latter to be swung back on the ground substantially parallel to the longitudinal axis of said fuselage.

9. An aircraft fuselage as claimed in claim 8 comprising two radius arms one of which is shortened and widened as compared with the other, a hinge panel hinged at one edge to said shortened and widened radius rod and at the other edge to said nose portion and a detachable connection between said other radius arm and said nose section, said two radius arms being hinged about a transverse horizontal axis to said cockpit.

10. An aircraft fuselage as claimed in claim 8, comprising two radius arms hinged to said cockpit on both sides thereof about a transverse horizontal axis, one of said radius arms being shorter and wider than the other, a hinge panel hinged about a vertical axis at one vertical edge to said shorter and wider radius arm and at its other vertical edge hinged about a vertical axis to said nose portion, and an extensible connection between said other radius arm and said nose section.

11. An aircraft fuselage, comprising in combination: a main fuselage portion, a pilot's cockpit fixedly attached to said main fuselage portion, a nose portion hinged to said cockpit both about a transverse horizontal axis and about a lateral vertical axis so as to be capable of being lowered in flight preparatory to landing to increase the pilot's downward vision, and to be swung back on the ground so as to shorten the overall length of the aircraft fuselage by the length of said nose portion, and a radar dish included in said nose section, the latter serving as a radome.

References Cited by the Examiner
UNITED STATES PATENTS

| | | | |
|---|---|---|---|
| 2,778,586 | 1/57 | Nyerges et al. | 244—120 |
| 2,872,137 | 2/59 | Gluhareff | 244—120 |
| 2,943,756 | 7/60 | White | 244—137 X |
| 3,009,672 | 11/61 | Tharratt | 244—137 |

FERGUS S. MIDDLETON, *Primary Examiner.*